United States Patent
Shah et al.

(10) Patent No.: US 11,609,622 B2
(45) Date of Patent: Mar. 21, 2023

(54) GROUND AND SUPPLY CABLE COMPENSATION ARCHITECTURE FOR USB POWER DELIVERY SUBSYSTEM

(71) Applicant: Cypress Semiconductor Corporation, San Jose, CA (US)

(72) Inventors: Pulkit Shah, Bangalore (IN); Hariom Rai, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 37 days.

(21) Appl. No.: 17/318,906

(22) Filed: May 12, 2021

(65) Prior Publication Data

US 2022/0066532 A1 Mar. 3, 2022

Related U.S. Application Data

(60) Provisional application No. 63/074,021, filed on Sep. 3, 2020.

(51) Int. Cl.
| | |
|---|---|
| *G06F 1/3234* | (2019.01) |
| *H02J 7/00* | (2006.01) |
| *B60R 16/02* | (2006.01) |
| *G06F 13/42* | (2006.01) |
| *H01R 25/00* | (2006.01) |

(52) U.S. Cl.
CPC ............ *G06F 1/3253* (2013.01); *B60R 16/02* (2013.01); *G06F 13/4282* (2013.01); *H02J 7/0042* (2013.01); *G06F 2213/0042* (2013.01); *H01R 25/006* (2013.01); *H01R 2201/26* (2013.01)

(58) Field of Classification Search
CPC ............... G06F 1/3253; G06F 13/4282; G06F 2213/0042; G06F 1/263; G06F 1/266; G06F 13/4068; B60R 16/02; H02J 7/0042; H02J 1/08; H01R 25/006; H01R 2201/26; H01R 29/00; H01R 13/652; H01R 13/665; H01R 13/6691
See application file for complete search history.

(56) References Cited

U.S. PATENT DOCUMENTS

| | | | | |
|---|---|---|---|---|
| 2005/0198407 | A1* | 9/2005 | Lee ..................... | G06F 1/266 710/15 |
| 2006/0218330 | A1* | 9/2006 | Tsunekawa ......... | G06F 13/4291 710/302 |
| 2012/0210144 | A1* | 8/2012 | Wiehardt ............ | G06F 13/4247 713/300 |

(Continued)

*Primary Examiner* — Faisal M Zaman

(57) ABSTRACT

A multi-port Universal Serial Bus Type-C (USB-C) controller with ground and supply cable compensation technologies is described. A USB-C controller includes a first power control circuit (PCU) coupled to a system ground terminal and a first ground terminal and a second PCU coupled to the system ground terminal and a second ground terminal. The first PCU receives a first ground signal indicative of a first ground potential at a first USB-C connector and adjusts a first power voltage line (VBUS) signal on the first VBUS terminal based on the first ground signal and the system ground. The second PCU receives a second ground signal indicative of a second ground potential at a second USB-C connector and adjusts a second VBUS signal on the second VBUS terminal based on the second ground signal and the system ground.

20 Claims, 5 Drawing Sheets

(56) References Cited

U.S. PATENT DOCUMENTS

| | | | | |
|---|---|---|---|---|
| 2015/0035477 | A1* | 2/2015 | Wong | G06F 1/263 |
| | | | | 320/165 |
| 2015/0362973 | A1* | 12/2015 | Tsai | G06F 1/266 |
| | | | | 713/322 |
| 2017/0033518 | A1* | 2/2017 | Cornelius | H01R 13/6485 |
| 2018/0026467 | A1* | 1/2018 | Shin | H02J 7/0068 |
| | | | | 320/107 |
| 2018/0032450 | A1* | 2/2018 | Lee | G06F 21/85 |
| 2018/0097315 | A1* | 4/2018 | Guo | H02J 1/08 |
| 2019/0138072 | A1* | 5/2019 | Kuroi | G06F 1/28 |
| 2019/0138078 | A1* | 5/2019 | Regupathy | G06F 1/3253 |
| 2020/0133319 | A1* | 4/2020 | Loder | H02J 3/386 |
| 2020/0339265 | A1* | 10/2020 | Yilmaz | H01R 25/006 |
| 2022/0066532 | A1* | 3/2022 | Shah | B60R 16/02 |

* cited by examiner

GROUND AND SUPPLY CABLE COMPENSATION ARCHITECTURE FOR USB POWER DELIVERY SUBSYSTEM

RELATED APPLICATIONS

This application claims the benefit and priority of U.S. Provisional Application No. 63/074,021, filed Sep. 3, 2020, the entire contents of which are incorporated by reference herein.

BACKGROUND

Various electronic devices (e.g., such as smartphones, tablets, notebook computers, laptop computers, hubs, chargers, adapters, etc.) are configured to transfer power through Universal Serial Bus (USB) connectors according to USB power delivery protocols defined in various revisions of the USB Power Delivery (USB-PD) specification. For example, in some applications, an electronic device may be configured as a power consumer to receive power through a USB connector (e.g., for battery charging). In contrast, in other applications, an electronic device may be configured as a power provider to provide power to another connected device through a USB connector.

BRIEF DESCRIPTION OF THE DRAWINGS

The disclosure is illustrated by way of example, and not of limitation, in the figures of the accompanying drawings.

DETAILED DESCRIPTION

Figure 1:
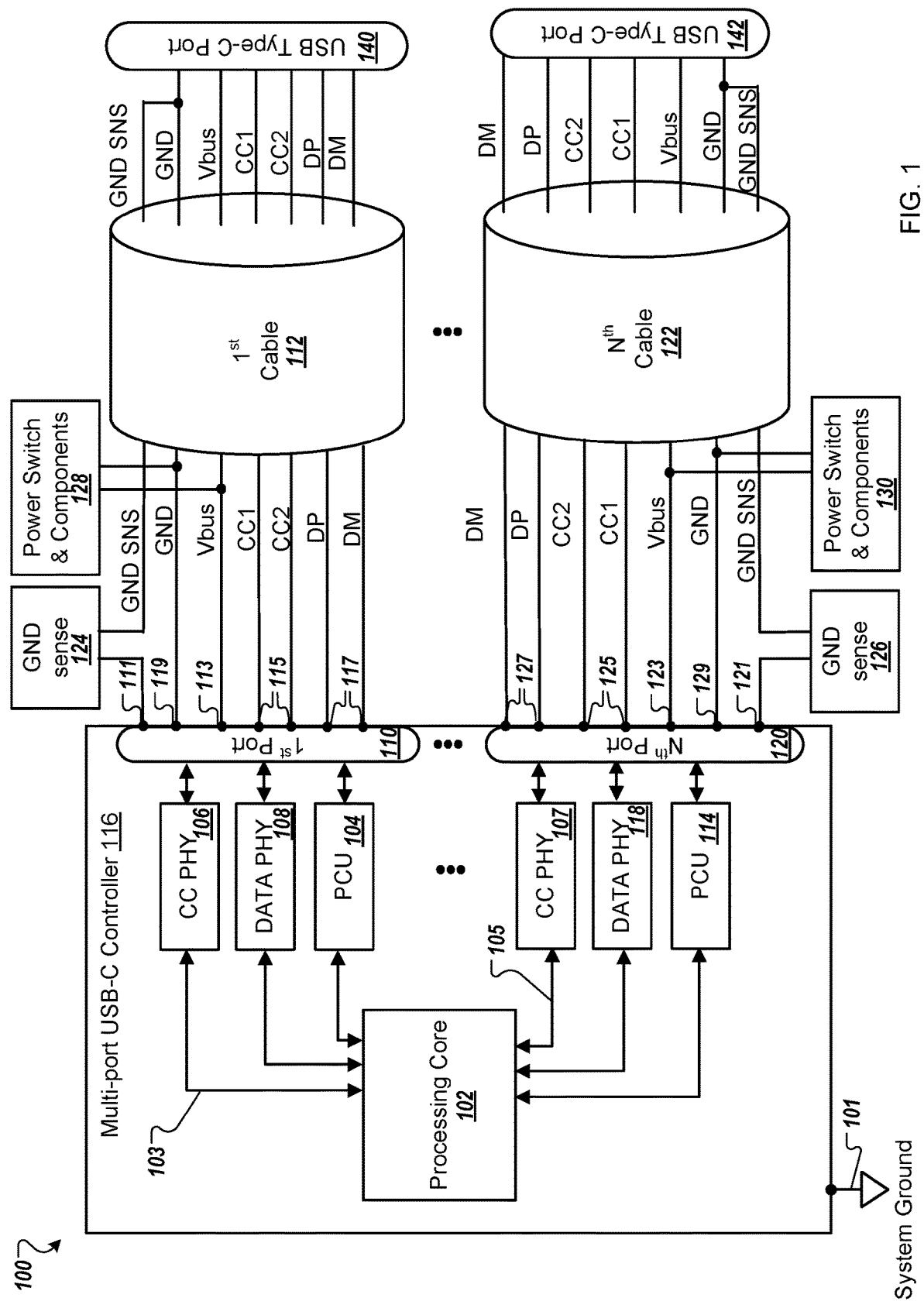
FIG. 1 is a block diagram of a multi-port Universal Serial Bus Power Delivery (USB-PD) device with ground and supply cable compensation, according to at least one embodiment.

The following description sets forth numerous specific details such as examples of specific systems, components, methods, and so forth, in order to provide a good understanding of various embodiments of the techniques described herein for providing ground and supply cable compensation such as used in USB power delivery (PD) applications. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the invention. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples" are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of techniques for providing a multi-port Universal Serial Bus Type-C (USB-C) controller with ground and supply cable compensation technologies in electronic devices in USB-PD. Examples of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity and charging devices (e.g., hubs, docking stations, adapters, chargers, etc.), audio/video/data recording and/or playback devices (e.g., cameras, voice recorders, hand-held scanners, monitors, etc.), and other similar electronic devices that can use USB connectors (interfaces) for communication, battery charging, and/or power delivery. In at least one embodiment, a USB-C controller includes a first power control circuit (PCU) coupled to a system ground terminal and a first ground terminal and a second PCU coupled to the system ground terminal and a second ground terminal. The first PCU receives a first ground signal indicative of a first ground potential at a first USB-C connector and adjusts a first power voltage (VBUS) signal on the first VBUS terminal based on the first ground signal and the system ground. The second PCU receives a second ground signal indicative of a second ground potential at a second USB-C connector and adjusts a second VBUS signal on the second VBUS terminal based on the second ground signal and the system ground.

In at least one embodiment, a USB-C controller includes USB Data ports (CC PHY or USB Data line) coupled to a first ground terminal and a second data port coupled to a second ground terminal. The first data port receives a first ground signal indicative of a first ground potential at a first USB-C connector and adjusts data output (CC1/CC2 or DP/DM) signal on the data terminal based on the first ground signal. The second data port receives a second ground signal indicative of a second ground potential at a second USB-C connector and adjusts data output (CC1/CC2 or DP/DM) signal on the data terminal based on the second ground signal.

The embodiments described herein can be used for alternating current to direct current (AC-DC) USB Type-C power adapters with a provider FET (e.g., a pass gate FET, an N-channel FET (NFET) switch), AC-DC power adapters, Type-C/PD products using a provider FET for a provider or consumer path, power-adapter solutions along with Type-C PD capability, and USB Type-C compliant DC-DC power providers and/or suppliers with provider FET.

A USB-enabled electronic device or a system may comply with at least one release of the USB specification. Examples of such USB specifications include, without limitation, the USB Specification Revision 2.0, the USB 3.0 Specification, the USB 3.1 Specification, and/or various supplements (e.g., such as On-The-Go, or OTG), versions and errata thereof. The USB specifications generally define the characteristics (e.g., attributes, protocol definition, types of transactions, bus management, programming interfaces, etc.) of a differential serial bus that are required to design and build standard communication systems and peripherals. For example, a USB-enabled peripheral device attaches to a USB-enabled host device through a USB port of the host device to form a USB-enabled system. A USB 2.0 port includes a power voltage line of 5V (denoted VBUS), a differential pair of data lines (denoted D+ or DP, and D- or DN), and a ground line for power return (denoted GND). A USB 3.0 port also provides the VBUS, D+, D-, and GND lines for backward compatibility with USB 2.0. In addition, to support a faster differential bus (the USB SuperSpeed bus), a USB 3.0 port also provides a differential pair of transmitter data lines (denoted SSTX+ and SSTX-), a differential pair of receiver data lines (denoted SSRX+ and SSRX-), a power line for power (denoted DPWR), and a ground line for power return (denoted DGND). A USB 3.1 port provides the same lines as a USB 3.0 port for backward compatibility with USB 2.0 and USB 3.0 communications, but extends the performance of the SuperSpeed bus by a collection of features referred to as Enhanced SuperSpeed.

A more recent technology for USB connectors, called USB Type-C, is defined in various releases and/or versions of the USB Type-C specification. The USB Type-C specification defines Type-C receptacle, Type-C plug, and Type-C cables that can support USB communications as well as power delivery over newer USB power delivery protocols defined in various revisions/versions of the USB-PD specification. Examples of USB Type-C functions and requirements may include, without limitation, data and other communications according to USB 2.0 and USB 3.0/3.1, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, etc. According to the USB Type-C specification(s), a Type-C port provides VBUS, D+, D-, GND, SSTX+, SSTX-, SSRX+, and SSRX- lines, among others. In addition, a Type-C port also provides a Sideband Use (denoted SBU) line for signaling of sideband functionality and a Configuration Channel (denoted CC) line for discovery, configuration, and management of connections across a Type-C cable. A Type-C port may be associated with a Type-C plug and/or a Type-C receptacle. For ease of use, the Type-C plug and the Type-C receptacle are designed as a reversible pair that operates regardless of the plug-to-receptacle orientation. Thus, a standard USB Type-C connector, disposed as a standard Type-C plug or receptacle, provides terminals for four VBUS lines, four ground return (GND) lines, two D+ lines (DP1 and DP2), two D- lines (DN1 and DN2), two SSTX+ lines (SSTXP1 and SSTXP2), two SSTX- lines (SSTXN1 and SSTXN2), two SSRX+ lines (SSRXP1 and SSRXP2), two SSRX- lines (SSRXN1 and SSRXN2), two CC lines (CC1 and CC2), and two SBU lines (SBU1 and SBU2), among others.

Some USB-enabled electronic devices may be compliant with a specific revision and/or version of the USB-PD specification. The USB-PD specification defines a standard protocol designed to enable the maximum functionality of USB-enabled devices by providing more flexible power delivery along with data communications over a single USB Type-C cable through USB Type-C ports. The USB-PD specification also describes the architecture, protocols, power supply behavior, parameters, and cabling necessary for managing power delivery over USB Type-C cables at up to 100 W of power. According to the USB-PD specification, devices with USB Type-C ports (e.g., such as USB-enabled devices) may negotiate for more current and/or higher or lower voltages over a USB Type-C cable than are allowed in older USB specifications (e.g., such as the USB 2.0 Specification, USB 3.1 Specification, the USB Battery Charging Specification Rev. 1.1/1.2, etc.). For example, the USB-PD specification defines the requirements for a power delivery contract (PD contract) that can be negotiated between a pair of USB-enabled devices. The PD contract can specify both the power level and the direction of power transfer that both devices can accommodate, and can be dynamically re-negotiated (e.g., without device un-plugging) upon request by either device and/or in response to various events and conditions, such as power role swap, data role swap, hard reset, failure of the power source, etc.

According to the USB-PD specification, an electronic device is typically configured to deliver power to another device through a power path configured on a USB VBUS line. The device that provides the power is typically referred to as (or includes) a "provider" (or a power source), and the device that consumes power is typically referred to as (or includes) a "consumer" (or a power sink). A power path typically includes a power switch coupled in-line on the VBUS line and configured to turn power delivery on and off.

As described above, the CC lines (e.g., CC1/CC2) in USB-PD can be used for discovery (attach or detach detection), power supply to cable ICs and communications between downstream facing ports (DFPs) and upstream facing ports (UFPs). An eye diagram needs to be met on the CC terminals of a connector when transmitting data for communication, such as described below with respect to FIGS. 2-3. In certain applications, like automotive applications, a system ground (also referred to as "chip ground") and connector ground are connected through a long cable (e.g., from a dashboard to a rear-seat panel). In some cases, the cable can have a length that causes voltage drops. When delivering high power (3 A-5 A load current) over the cable, there can be a significant voltage drop on the ground terminal at the connector due to the long cable. For example, the connector ground can have a voltage drop (e.g., 250 mV) from the system ground. When a transmitter drives a signal level corresponding to a "0" on CC lines, the signal appears to have a lower voltage level (e.g., -250 mV) at the connector, which would fail the eye diagram as the inner and upper bounds on "0" is +/-75 mV.

Similarly, a receiver coupled to the CC line can be sensitive to the difference in ground potentials. There can be a voltage shift (e.g., 250 mV to 500 mV shift) on the ground signal in 1.2V signaling. For example, there can be a 500 mV shift with a first portion being 250 mV due to the connector ground and 250 mV due to the cable.

In addition, the VBUS supply is used to deliver power to sink devices through a cable. The VBUS output voltage can have an error (e.g., +/−250 mV error) with respect to the connector ground terminal and can have a voltage drop on the VBUS line, which is significant at 5V (e.g., +/−10%).

Described herein are various embodiments of techniques for providing ground and supply cable compensation in a multi-port USB-C controller. The embodiments described herein may address the deficiencies described above and other challenges by a multi-port USB-PD system with integrated power control architecture that can meet supply and signal electrical requirements with a significant voltage drop on connector ground and supply ground. The embodiments described herein can provide one ground terminal per port dedicated to a physical interface (e.g., CC_PHY). This terminal is isolated from the main chip ground (GND) or power control ground (PGND). Digital and analog level shifters can be used between processing core signals and the physical interface. Since the connector ground and the physical interface's ground are the same, there is no ground shift seen at a connector or a receiver. The shifted ground can be detected by power control functions (or output regulation function or analog-to-digital converter (ADC) and the shifted ground can be used to correct the VBUS supply accordingly.

FIG. 1 is a block diagram of a multi-port USB-PD device 100 with ground and supply cable compensation according to one embodiment. The multi-port USB-PD device 100 includes a multi-port USB-C controller 116 (hereinafter "USB-C controller"). The USB-C controller 116 may be disposed in a chip package and includes a USB-PD subsystem configured in accordance with the techniques for ground and supply cable compensation described herein. The USB-C controller 116 is configured to negotiate a PD contract with a consumer device (not shown) attached to USB Type-C port 140 and control through an output terminal the required VBUS voltage. USB Type-C port 140 is can also be referred to as a USB Type-C connector and is typically associated with a Type-C plug, but it should be understood that in various embodiments, the USB Type-C port may be associated with a Type-C receptacle instead. The USB-C controller 116 is configured to negotiate a PD control with other consumer devices attached to other USB Type-C ports, including an $N^{th}$ USB Type-C port 142.

In at least one embodiment, the USB Type-C port 140 is located at a first location, such as a first location within a vehicle, and the USB-C controller 116 is located at a second location, such as a second location within the vehicle. The USB Type-C port 140 is coupled to a first port 110 of the USB-C controller 116 via a first cable 112. A second USB Type-C port is coupled to a second port of the USB-C controller 116 via a second cable (not illustrated in FIG. 1.). An Nth USB Type-C port 142 is coupled to an Nth port 120 of the USB-C controller 116 via an Nth cable 122. For simplicity, the first and Nth ports 110, 120 are referred to as first and second ports 110, 120, respectively.

In at least one embodiment, the USB-C controller 116 includes a system ground terminal 101, the first port 110, and the second port 120. The first port 110 includes a first ground terminal 111, a first VBUS terminal 113, a first power supply ground terminal 119, CC terminals 115, and data terminals 117, and the second port 120 includes a second ground terminal 121, a second VBUS terminal 123, a second power supply ground terminal 129, CC terminals 125, and data terminals 127. The first port 110 couples to the first USB-C connector 140 via the first cable 112. The first port 110 includes at least the first ground terminal 111, a first VBUS terminal 113, a first power supply ground terminal 119, a first CC terminal (CC1), a second CC terminal (CC2). In another embodiment, the first port 110 also includes a first data terminal (DP) and a second data terminal (DM). The second port 120 couples to the second USB-C connector 142 via the second cable 122. The second port 120 includes at least the second ground terminal 121, a second VBUS terminal 123, a second power supply ground terminal 129, a first CC terminal (CC1), a second CC terminal (CC2). In another embodiment, the second port 120 also includes a first data terminal (DP) and a second data terminal (DM).

In at least one embodiment, the USB-C controller 116 includes a first power control circuit (PCU) 104 coupled to the system ground terminal 101 and the first port 110. The first PCU 104 receives a first ground signal indicative of a first ground potential at the USB Type-C port 140 (e.g., a first USB-C connector). The first PCU 104 adjusts a first VBUS signal on the first VBUS terminal based on the first ground signal and a system ground signal on the system ground terminal 101. The first ground signal is electrically isolated from the system ground signal on the system ground terminal 101. The USB-C controller 116 includes a second PCU 114 coupled to the system ground terminal 101 and the second port 120. The second PCU 114 receives a second ground signal indicative of a second ground potential at the USB Type-C port 142 (e.g., a second USB-C connector) and adjusts a second VBUS signal on the second VBUS terminal based on the second ground signal and the system ground signal on the system ground terminal 101. The second ground signal is electrically isolated from the system ground signal on the system ground terminal 101.

In at least one embodiment, the USB-C controller 116 includes a first CC physical interface 106 coupled to the first ground terminal, the first CC terminal, and the second CC terminal of the first port 110. The USB-C controller 116 includes a second CC physical interface 107 coupled to the second ground terminal, the first CC terminal, and the second CC terminal of the second port 120. The first CC physical interface 106 operates at the same first ground potential as the USB Type-C port 140 (e.g., first USB-C connector). The second CC physical interface 107 operates at the same second ground potential as the USB Type-C port 142 (e.g., second USB-C connector).

In at least one embodiment, the USB-C controller 116 includes a processing core 102 coupled to the first PCU 104 and the second PCU 114. The processing core 102 is configured to send or receive first control signals 103 using the first CC physical interface 106 and send or receive second control signals 105 using the second CC physical interface 114.

In at least one embodiment, the USB-C controller 116 is coupled to a first ground-sense circuit 124. In particular, the first ground terminal of the first input 110 is coupled to the first ground-sense circuit 124. The first ground-sense circuit 124 is configured to sense the first ground potential at the USB Type-C port 140 (e.g., first USB-C connector) and generate the first ground signal indicative of the first ground potential. In particular, the first ground-sense circuit 124 measures the first ground potential on the first power supply ground line at the USB Type-C port 140, the first power supply ground line being coupled to the first power supply ground terminal 119 via the first cable 112. The USB-C controller 116 is coupled to a second ground-sense circuit 126. In particular, the second ground terminal of the second port 120 is coupled to the second ground-sense circuit 126. The second ground-sense circuit 126 is configured to sense the second ground potential at the USB Type-C port 142 (e.g., second USB-C connector) and generate the second ground signal indicative of the second ground potential. In particular, the second ground-sense circuit 126 measures the second ground potential on the second power supply ground line at the USB Type-C port 142, the second power supply ground line being coupled to the second power supply ground terminal 129 via the second cable 122.

In at least one embodiment, the USB-C controller 116 includes a first data physical interface 108 coupled to a first data terminal and a second data terminal of the first port 110. The first data physical interface 108 operates at the same first ground potential as the USB Type-C port 140 (e.g., first USB-C connector). The USB-C controller 116 includes a second data physical interface 118 coupled to a third data terminal and a fourth data terminal of the second port 120. The second data physical interface 118 operates at the same second ground potential as the USB Type-C port 142 (e.g., second USB-C connector).

In at least one embodiment, the USB-C controller 116 is coupled to a power and switch components 128. The power and switch components 128 can include a four-switch buck-boost DC-DC converter. The switches can be external NFETs.

The embodiments described herein can be implemented in a power delivery system, such as a serial bus-compatible power supply device. An example of a serial bus-compatible power supply device may include a serial bus power delivery (SBPD) device, a USB-compatible power supply device, or the like. In some embodiments, the SBPD device is a multi-port USB-PD device compatible with the USB-PD standard or, more generally, with the USB standard. For example, the SBPD device may provide an output voltage (e.g., VBUS_C, power supply voltage) based on an input voltage (e.g., VBUS_IN, power supply voltage) on each of the multiple ports. The SBPD device may include the various embodiments described herein to facilitate communications between a primary-side controller and a secondary-side controller. The SBPD device may include a power converter (e.g., an AC-DC converter) and a power control analog subsystem (e.g., a USB-PD controller). The power control analog subsystem may include the circuitry, functionality, or both, as described herein for communicating information across a galvanic isolation barrier.

In embodiments, the SBPD device is connected to a power source, such as a wall socket power source that provides AC power. In other embodiments, the power source may be a different power source, such as a vehicle battery, and may provide DC power to the SBPD device. The power converter may convert the power received from a power source (e.g., convert power received to VBUS_IN, ranging from 3.3V to 21.5V). For example, a power converter may be an AC-DC converter and convert AC power from the power source to DC power. In some embodiments, the power converter is a flyback converter, such as a secondary-controlled flyback converter, that provides galvanic isolation between the input (e.g., primary side) and the output (e.g., secondary side). In another embodiment, the device may be a consumer device receiving power from the SBPD device. The consumer device may control the gate-source voltage of its provider FET with a secondary gate driver integrated onto the secondary-side controller of the consumer device.

In some embodiments, the SBPD device provides VBUS_C to a sink device (e.g., via a Configuration Channel (CC) specifying a particular output voltage and possibly an output current). SBPD device may also provide access to ground potential (e.g., ground) to the sink device. In some embodiments, the providing of the VBUS_C is compatible with the USB-PD standard. The power control analog subsystem may receive VBUS_IN from the power converter. The power control analog subsystem may output VBUS_IN. In some embodiments, the power control analog subsystem is a USB Type-C controller compatible with the USB Type-C standard. The power control analog subsystem may provide system interrupts responsive to the VBUS_IN and the VBUS_C.

In some embodiments, any of the components of the SBPD device may be part of an IC, or alternatively, any of the components of the SBPD device may be implemented in its own IC. For example, the power converter and the power control analog subsystem may be discrete ICs with separate packaging and terminal configurations.

In some embodiments, the SBPD device may provide a complete USB Type-C and USB-Power Delivery port control solution for notebooks, dongles, monitors, docking stations, power adapters, vehicle chargers, power banks, mobile adaptors, and the like.

Figure 2:
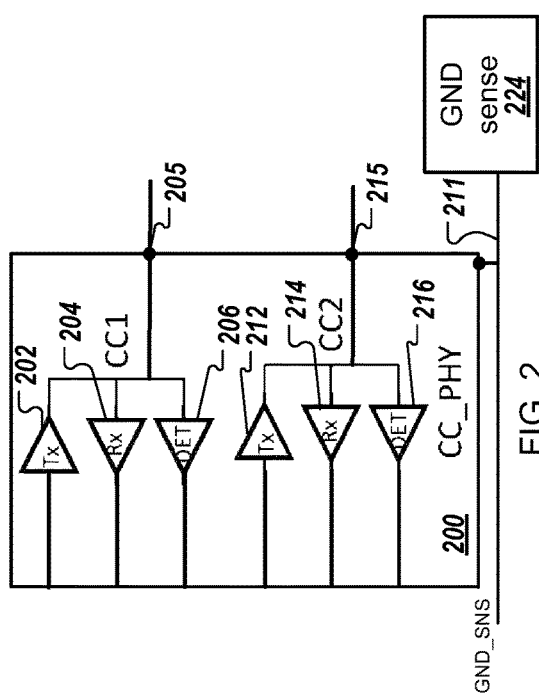
FIG. 2 is a schematic diagram of a Configuration Channel (CC) physical interface, according to at least one embodiment.

FIG. 2 is a schematic diagram of a Configuration Channel (CC) physical interface 200, according to at least one embodiment. The CC physical interface 200 includes a transmitter 202, a receiver 204, and detector circuit 206 for a first CC terminal 205. The CC physical interface 200 includes a transmitter 212, a receiver 214, and detector circuit 216 for a second terminal 215. The transmitters and receivers can be used for discovery and other communications between DFPs and UFPs. When transmitting data by the transmitter 202 (or transmitter 212), an eye diagram needs to be met on the CC terminals of a connector. In certain applications, a ground terminal of the USB-C controller and connector ground are connected through a long cable which can be 5 meters (m) to 10 m, for example. There can be a voltage drop between the connector ground and the ground terminal on the cable that affects the eye diagram requirements. So, when the transmitter 202 (or 212) drives a signal level corresponding to a "0" on CC lines, the signal appears to have a lower voltage level at the connector than at the ground terminal at the USB-C controller. This voltage drop can cause the CC physical interface 200 to fail the eye diagram as the inner and upper bounds on the signal level "0" is +/−75 mV.

As described above, the CC physical interface 200 can use the same ground potential as at the connector to remove a ground shift caused by the cable. In at least one embodiment, a ground-sense circuit 224 measures a ground signal at a connector (not illustrated in FIG. 2) and generates a first ground signal 211 indicative of the first ground potential to be used by the CC physical interface 200. Put another way, the CC physical interface 200 operates with the same ground potential as present at the connector ground, even if the cable causes a ground shift. The USB-C controller can include a first ground terminal 111 to receive the first ground signal 211 (e.g., GND_SNS) to be used by the CC physical interface 200. The first ground signal 211 can also be used for power supply compensation, as described below.

Similarly, the USB-C controller can include a separate ground terminal for each of the other ports. In a dual-port system, the USB-C controller includes a first ground terminal for a first CC physical interface and a second ground terminal for a second CC physical interface. For a multi-port system of N ports, the USB-C controller includes N ground terminals per each of the ports. In at least one embodiment, the data physical interfaces can use the same ground signals being measured and shifted by the ground-sense circuit for the CC physical interfaces. In this manner, the USB-C controller and ground-sense circuits can be used for ground compensation for ground shifts in the multiple cables between the USB-C controller and the multiple connectors, where the multiple cables may have different lengths (and thus may cause different voltage drops) from each other.

Figure 3:
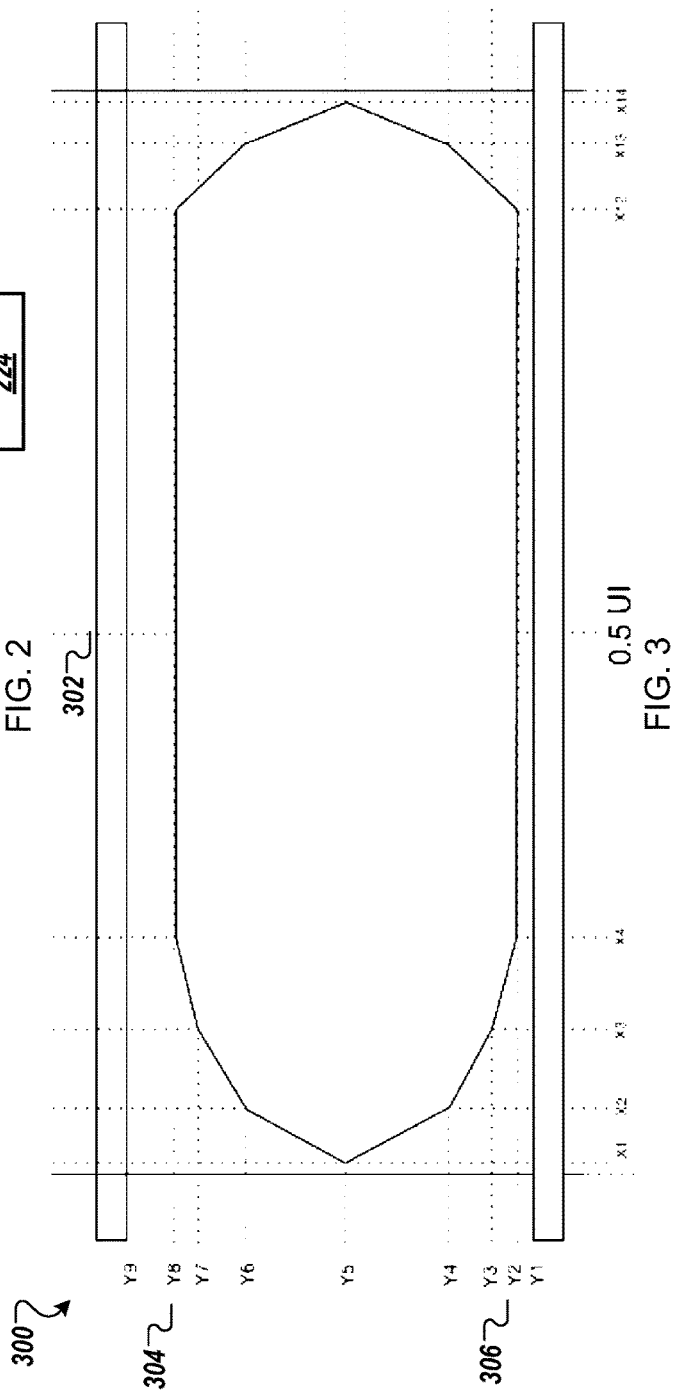
FIG. 3 is a graph illustrating an eye diagram of a receiver of a CC physical interface, according to at least one embodiment.

FIG. 3 is a graph illustrating an eye diagram 300 of a receiver of a CC physical interface, according to at least one embodiment. The eye diagram 300 represents the eye diagram of the receiver 204 of FIG. 2, but the receiver 214 and the transmitters 202, 212 of the CC physical interface can have similar eye diagrams. The eye diagram 300 shows a unit interval (UI) in which a signal on the CC1 line can be sampled correctly. Ideally, the signal on the CC1 line should be sampled at center 302 of the eye diagram (e.g., 0.5 UI), and the sampled value should be between an upper bound 304 and a lower bound 306 for the eye diagram 300 for proper sampling. When the cable causes ground shifts, the signals received on the CC1 line can fail to meet the eye diagram 300 as described herein. Using the embodiments described herein, the ground shift can be sensed and shifted so that the CC physical interface 200 can operate with the same ground potential as at the connector ground. Using the same ground potential for the CC physical interface 200 as present at the connector ground allows the CC physical interface 200 to meet the eye diagram 300 for proper sampling of signals on the CC1 line. Similarly, using the same ground potential helps with sampling signals on the CC2 line. Similarly, the same techniques can be used for other control lines or data lines as described herein.

Figure 4:
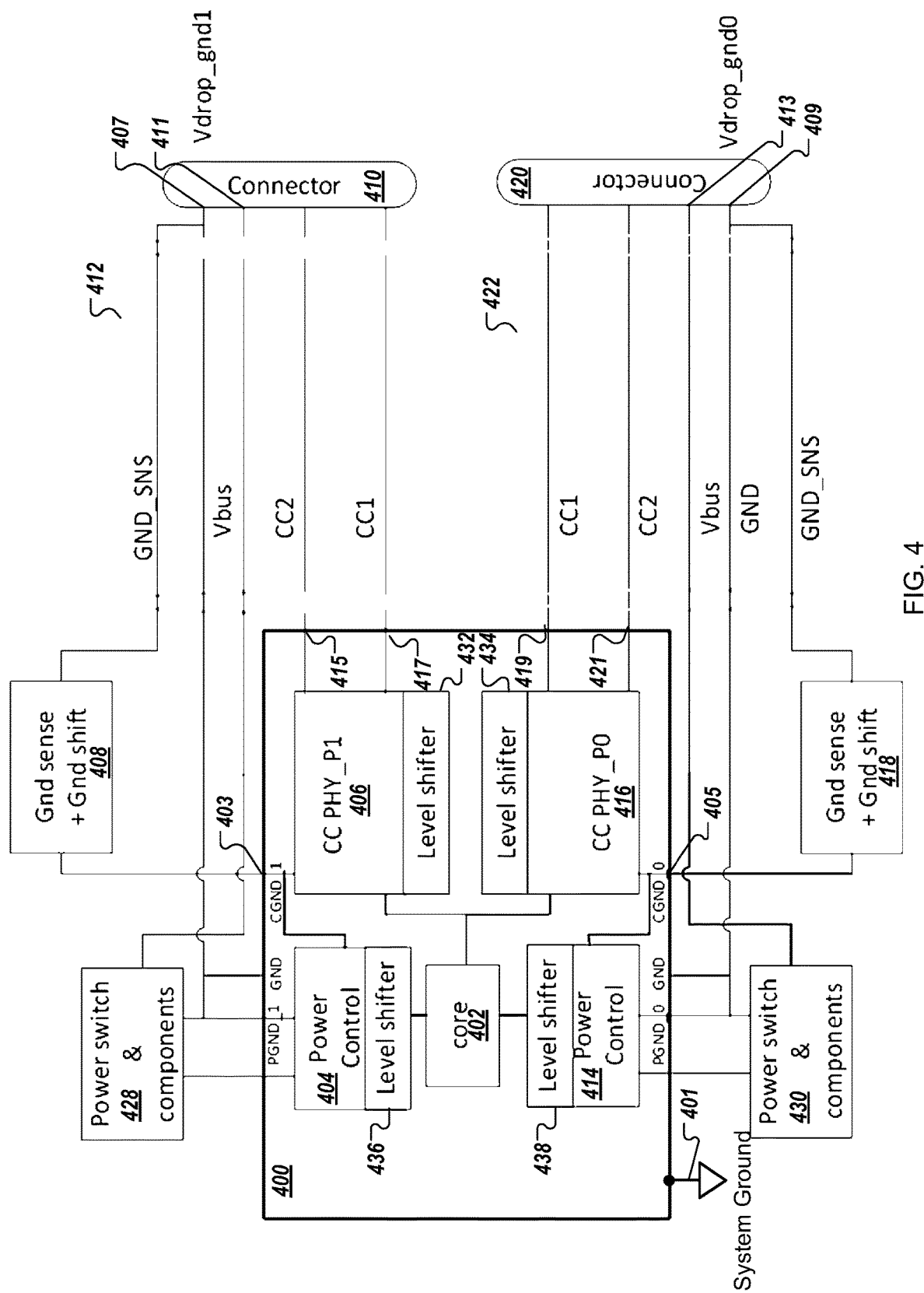
FIG. 4 is a block diagram of a dual-port USB-C controller with ground and supply cable compensation, according to at least one embodiment.

FIG. 4 is a block diagram of a dual-port USB-C controller 400 with ground and supply cable compensation, according to at least one embodiment. The dual-port USB-C controller 400 is coupled to a first USB-C connector 410 via a first cable 412 and a second USB-C connector 420 via a second cable 422. The dual-port USB-C controller 400 includes a first ground terminal 401 coupled to a system ground, a second ground terminal 403, and a third ground terminal 405. The first ground terminal 401 receives a system ground signal. The second ground terminal 403 receives a first ground signal indicative of a first ground potential at a first ground terminal 407 at the first USB-C connector 410. The first ground signal is electrically isolated from the system ground signal. In other words, the first ground terminal 401 and the second ground terminal 403 are electrically isolated. The third ground terminal 405 receives a second ground signal indicative of a second ground potential at a second ground terminal 409 at the second USB-C connector 420. The second ground signal is electrically isolated from the system ground signal. In other words, the first ground terminal 401 and the third ground terminal 405 are electrically isolated.

The dual-port USB-C controller 400 is coupled to a power switch and switching components 428 to supply power to the first USB-C connector 410 and a power switch and switching components 430 to supply power to the second USB-C connector 420. The power switch and switching components 428 are coupled to the first ground terminal 407 and a first VBUS terminal 411 of the first USB-C connector 410. The power switch and switching components 430 are coupled to the second ground terminal 409 and a second VBUS terminal 413 of the second USB-C connector 420. The dual-port USB-C controller 400 includes a first PCU 404 that controls the power switch and switching components 428 to supply power on the first VBUS terminal 411 of the first USB-C connector 410. The dual-port USB-C controller 400 includes a second PCU 414 that controls the power switch and switching components 430 to supply power on the second VBUS terminal 413 of the second USB-C connector 420. The first PCU 404 is also coupled to the system ground terminal 401, the second ground terminal 403, and the first VBUS terminal 411. The first PCU 404 adjusts a first VBUS signal on the first VBUS terminal 411 based on the first ground signal and the system ground signal. The second PCU 414 is coupled to the system ground terminal 401, the third ground terminal 405, and the second VBUS terminal 413. The second PCU 414 adjusts a second VBUS signal on the second VBUS terminal 413 based on the second ground signal and the system ground signal. In at least one embodiment, the system ground terminal 401 has the same ground potential as the power ground terminals coupled to the power switch and switching components 428, 430. Alternatively, the PCUs can receive a power ground signal from the power switch and switching components and the sensed ground signal indicative of the connector ground. The PCUs can use the power ground signal and the sensed ground signal to detect and compensate for a voltage drop over the cable. The PCU can adjust the power to compensate for voltage drops on the VBUS lines, considering the measured ground potential at the respective connectors.

In at least one embodiment, the dual-port USB-C controller 400 includes a first CC physical interface 406 and a second CC physical interface 416. The first CC physical interface 406 is coupled to the second ground terminal 403, a first CC terminal 415, and a second CC terminal 417. The first CC physical interface 406 operates at the same first ground potential as the first USB-C connector 410. The first CC physical interface 406 uses the first ground signal received at the second ground terminal 403 that indicates the first ground potential at the first ground terminal 407 of the first USB-C connector 410. The second CC physical interface 416 is coupled to the third ground terminal 405, a first CC terminal 419, and a second CC terminal 421. The second CC physical interface 416 operates at the same second ground potential as the second USB-C connector 420. The second CC physical interface 416 uses the second ground signal received at the third ground terminal 405 that indicates the second ground potential at the second ground terminal 409 of the second USB-C connector 420.

In at least one embodiment, the dual-port USB-C controller 400 includes a processing core 402 coupled to the first PCU 404 and the second PCU 414. The processing core 402 is configured to send or receive first control signals to or from another device connected to the first USB-C connector 410 using the first CC physical interface 406. The processing core 402 is also configured to send or receive second control signals to or from another device connected to the second USB-C connector 420 using the second CC physical interface 416.

In at least one embodiment, the dual-port USB-C controller 400 includes a first level shifter 432 coupled to the first CC physical interface 406 and the processing core 402. The first level shifter 432 is configured to adjust the voltage levels of the first control signals between the processing core 402 and the first CC physical interface 406. The dual-port USB-C controller 400 includes a second level shifter 434 coupled to the second CC physical interface 416 and the processing core 402. The second level shifter 434 is configured to adjust the voltage levels of the second control signals between the processing core 402 and the second CC physical interface 416.

In at least one embodiment, the dual-port USB-C controller 400 includes a third level shifter 436 coupled to the first PCU 404 and the processing core 402. The third level shifter 436 is configured to adjust voltage levels of signals between the first PCU 404 and the processing core 402. The dual-port USB-C controller 400 includes a fourth level shifter 438 coupled to the second PCU 414 and the processing core 402. The fourth level shifter 438 is configured to adjust voltage levels of signals between the second PCU 414 and the processing core 402.

In at least one embodiment, the dual-port USB-C controller 400 includes a first ground-sense circuit 408 coupled to the second ground terminal 403. The first ground-sense circuit 408 is configured to sense the first ground potential on the first ground terminal 407 at the first USB-C connector 410 and generate the first ground signal indicative of the first ground potential at the first USB-C connector 410. The first ground-sense circuit 408 can sense and shift the first ground signal so that the first ground signal is the same as the ground potential at the first ground terminal 407, even if there is a difference between the ground potential at the first PCU 404 and the ground potential at the first USB-C connector 410.

In at least one embodiment, the dual-port USB-C controller 400 includes a second ground-sense circuit 418 coupled to the third ground terminal 405. The second ground-sense circuit 418 is configured to sense the second ground potential on the second ground terminal 409 at the second USB-C connector 420 and generate the second ground signal indicative of the second ground potential at the second USB-C connector 420. The second ground-sense circuit 418 can sense and shift the second ground signal so that the second ground signal is the same as the ground potential at the second ground terminal 409, even if there is a difference between the ground potential at the second PCU 414 and the ground potential at the second USB-C connector 420.

In at least one embodiment, the dual-port USB-C controller 400 includes a first data physical interface coupled to a first data terminal and a second data terminal (not illustrated in FIG. 4). The first data physical interface operates at the same first ground potential as the first USB-C connector 410 in a similar manner as described above with respect to the first CC physical interface 406.

In at least one embodiment, the dual-port USB-C controller 400 includes a second data physical interface coupled to a third data terminal and a fourth data terminal (not illustrated in FIG. 4). The second data physical interface operates at the same second ground potential as the second USB-C connector 420 in a similar manner as described above with respect to the second CC physical interface 416.

In at least one embodiment, the dual-port USB-C controller 400 can be used in, or in connection with, a vehicle entertainment system. In at least one embodiment, the dual-port USB-C controller 400 includes a connector that connects to other subsystems of the vehicle entertainment system. Alternatively, the connector can connect to other systems, such as a head-unit charger, a rear-seat charger, a charger of an entertainment system, or the like. In at least one embodiment, the first USB-C connector 410 is located at a first location within a vehicle, and the dual-port USB-C controller 400 is located at a second location within the vehicle. The first cable 412 extends between the first location and the second location. In at least one embodiment, the second USB-C connector 420 is located at the first location with the first USB-C connector 410. In at least one embodiment, the second USB-C connector 420 is located at a third location, different from the first and second locations. In at least one embodiment, the second USB-C connector 420 is located at the second location with the dual-port USB-C controller 400.

In another embodiment, the dual-port USB-C controller 400 is part of a USB-PD subsystem used in various applications.

Figure 5:
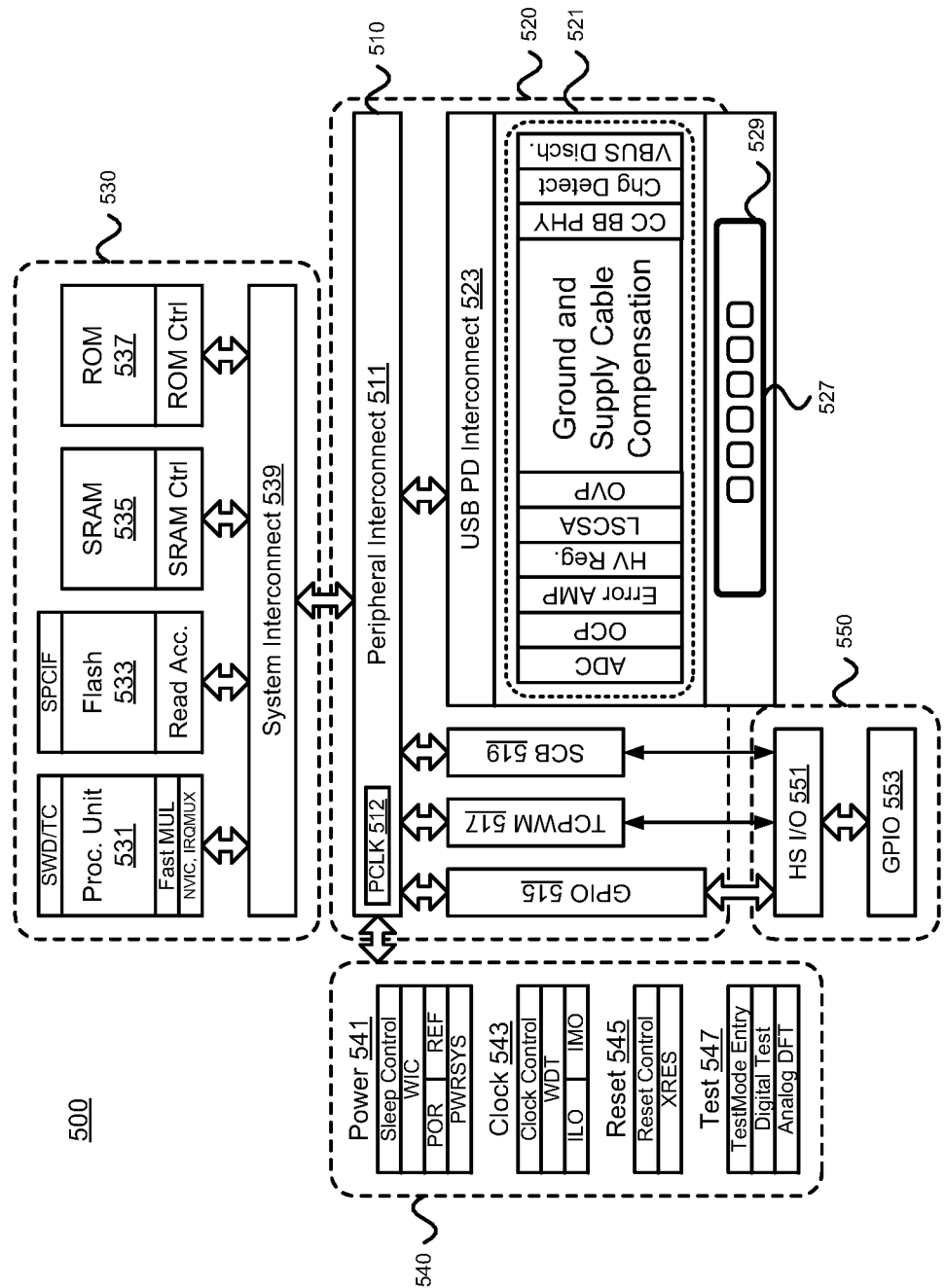
FIG. 5 is a block diagram illustrating a system for a USB device with ground and supply cable compensation for use in USB power delivery in accordance with some embodiments.

FIG. 5 is a block diagram illustrating a system 500 for a USB device with ground and supply cable compensation for use in USB power delivery in accordance with some embodiments. System 500 may include a peripheral subsystem 510, including a number of components for use in USB-PD. Peripheral subsystem 510 may include a peripheral interconnect 511 including a clocking module, peripheral clock (PCLK) 512 for providing clock signals to the various components of peripheral subsystem 510. Peripheral interconnect 511 may be a peripheral bus, such as a single-level or multi-level advanced high-performance bus (AHB), and may provide a data and control interface between peripheral subsystem 510, CPU subsystem 530, and system resources 540. Peripheral interconnect 511 may include controller circuits, such as direct memory access (DMA) controllers, which may be programmed to transfer data between peripheral blocks without input by, control of, or burden on CPU subsystem 530.

The peripheral interconnect 511 may be used to couple components of peripheral subsystem 510 to other components of system 500. Coupled to peripheral interconnect 511 may be a number of general-purpose input/outputs (GPIOs) 515 for sending and receiving signals. GPIOs 515 may include circuits configured to implement various functions such as pull-up, pull-down, input threshold select, input, and output buffer enabling/disable, single multiplexing, etc. Still, other functions may be implemented by GPIOs 515. One or more timer/counter/pulse-width modulator (TCPWM) 517 may also be coupled to the peripheral interconnect and include circuitry for implementing timing circuits (timers), counters, pulse-width modulators (PWMs) decoders, and other digital functions that may operate on I/O signals and provide digital signals to system components of system 500. Peripheral subsystem 510 may also include one or more serial communication blocks (SCBs) 519 for implementation of serial communication interfaces such as I2C, serial peripheral interface (SPI), universal asynchronous receiver/transmitter (UART), controller area network (CAN), clock extension peripheral interface (CXPI), etc.

For USB power delivery applications, peripheral subsystem 510 may include a USB power delivery subsystem 520 coupled to the peripheral interconnect and comprising a set of USB-PD modules 521 for use in USB power delivery. USB-PD modules 521 may be coupled to the peripheral interconnect 511 through a USB-PD interconnect 523. USB-PD modules 521 may include an analog-to-digital conversion (ADC) module for converting various analog signals to digital signals; an error amplifier (AMP) for regulating the output voltage on VBUS line per a PD contract; a high-voltage (HV) regulator for converting the power source voltage to a precise voltage (such as 3.5-5V) to power system 500; a low-side current sense amplifier (LSCSA) for measuring load current accurately, an over voltage protection (OVP) module and an over-current protection (OCP) module for providing over-current and over-voltage protection on the VBUS line with configurable thresholds and response times; one or more gate drivers for external power field-effect transistors (FETs) used in USB power delivery in provider and consumer configurations; and a communication channel PHY (CC BB PHY) module for supporting communications on a Type-C communication channel (CC)

line. USB-PD modules 521 may also include a charger detection module for determining that a charging circuit is present and coupled to system 500 and a VBUS discharge module for controlling the discharge of voltage on VBUS. USB power delivery subsystem 520 may also include pads 527 for external connections and electrostatic discharge (ESD) protection circuitry 529, which may be required on a Type-C port. USB-PD modules 521 may also include a communication module for retrieving and communicating information stored in non-volatile memory one controller with another controller, such as between a primary-side controller and a secondary-side controller of a flyback converter. USB-PD modules 521 may also include one or more modules for ground and supply cable compensation as described herein.

GPIO 515, TCPWM 517, and SCB 519 may be coupled to an input/output (I/O) subsystem 550, which may include a high-speed (HS) I/O matrix 551 coupled to a number of GPIOs 553. GPIOs 515, TCPWM 517, and SCB 519 may be coupled to GPIOs 553 through HS I/O matrix 551.

System 500 may also include a central processing unit (CPU) subsystem 530 for processing commands, storing program information, and data. CPU subsystem 530 may include one or more processing units 531 for executing instructions and reading from and writing to memory locations from a number of memories. Processing unit 531 may be a processor suitable for operation in an integrated circuit (IC) or a system-on-chip (SOC) device. In some embodiments, processing unit 531 may be optimized for low-power operation with extensive clock gating. In this embodiment, various internal control circuits may be implemented for processing unit operation in various power states. For example, processing unit 531 may include a wake-up interrupt controller (WIC) configured to wake the processing unit up from a sleep state, allowing power to be switched off when the IC or SOC is in a sleep state. CPU subsystem 530 may include one or more memories, including a flash memory 533, and static random access memory (SRAM) 535, and a read-only memory (ROM) 537. Flash memory 533 may be a non-volatile memory (NAND flash, NOR flash, etc.) configured for storing data, programs, and/or other firmware instructions. Flash memory 533 may include a read accelerator and may improve access times by integration within CPU subsystem 530. SRAM 535 may be a volatile memory configured for storing data and firmware instructions accessible by processing unit 531. ROM 537 may be configured to store boot-up routines, configuration parameters, and other firmware parameters and settings that do not change during the operation of system 500. SRAM 535 and ROM 537 may have associated control circuits. Processing unit 531 and the memories may be coupled to a system interconnect 539 to route signals to and from the various components of CPU subsystem 530 to other blocks or modules of system 500. System interconnect 539 may be implemented as a system bus such as a single-level or multi-level AHB. System interconnect 539 may be configured as an interface to couple the various components of CPU subsystem 530 to each other. System interconnect 539 may be coupled to peripheral interconnect 511 to provide signal paths between the components of CPU subsystem 530 and peripheral subsystem 510.

System 500 may also include a number of system resources 540, including a power module 541, a clock module 543, a reset module 545, and a test module 547. Power module 541 may include a sleep control module, a wake-up interrupt control (WIC) module, a power-on-reset (POR) module, a number of voltage references (REF), and a PWRSYS module. In some embodiments, power module 541 may include circuits that allow system 500 to draw and/or provide power from/to external sources at different voltage and/or current levels and to support controller operation in different power states, such as active, low-power, or sleep. In various embodiments, more power states may be implemented as system 500 throttles back operation to achieve a desired power consumption or output. Clock module 543 may include a clock control module, a watchdog timer (WDT), an internal low-speed oscillator (ILO), and an internal main oscillator (IMO). Reset module 545 may include a reset control module and an external reset (XRES) module. Test module 547 may include a module to control and enter a test mode as well as testing control modules for analog and digital functions (digital test and analog DFT).

System 500 may be implemented in a monolithic (e.g., single) semiconductor die. In other embodiments, various portions or modules of system 500 may in implemented on different semiconductor dies. For example, memory modules of CPU subsystem 530 may be on-chip or separate. In still other embodiments, separate-die circuits may be packaged into a single "chip," or remain separate and disposed on a circuit board (or in a USB cable connector) as separate elements.

System 500 may be implemented in a number of application contexts to provide USB-PD functionality thereto. In each application context, an IC controller or SOC implementing system 500 may be disposed and configured in an electronic device (e.g., a USB-enabled device) to perform operations in accordance with the techniques described herein. In one example embodiment, a system 500 may be disposed and configured in a personal computer (PC) power adapter for a laptop, a notebook computer, etc. In another example embodiment, system 500 may be disposed and configured in a power adapter (e.g., a wall charger) for a mobile electronic device (e.g., a smartphone, a tablet, etc.). In another example embodiment, system 500 may be disposed and configured in a wall socket that is configured to provide power over USB Type-A and/or Type-C port(s). In another example embodiment, system 500 may be disposed and configured in a car charger that is configured to provide power over USB Type-A and/or Type-C port(s). In yet another example embodiment, system 500 may be disposed and configured in a power bank that can get charged and then provide power to another electronic device over a USB Type-A or Type-C port. In other embodiments, a system like system 500 may be configured with the power switch gate control circuitry described herein and may be disposed in various other USB-enabled electronic or electro-mechanical devices.

It should be understood that a system, like system 500 implemented on or as an IC controller, may be disposed into different applications, which may differ with respect to the type of power source being used and the direction in which power is being delivered. For example, in the case of a car charger, the power source is a car battery that provides DC power, while in the case of a mobile power adapter, the power source is an AC wall socket. Further, in a PC power adapter, the flow of power delivery is from a provider device to a consumer device. In contrast, in the case of a power bank, the flow of power delivery may be in both directions depending on whether the power bank operates as a power provider (e.g., to power another device) or as a power consumer (e.g., to get charged itself). For these reasons, the various applications of system 500 should be regarded in an illustrative rather than a restrictive sense.

Figure 6:
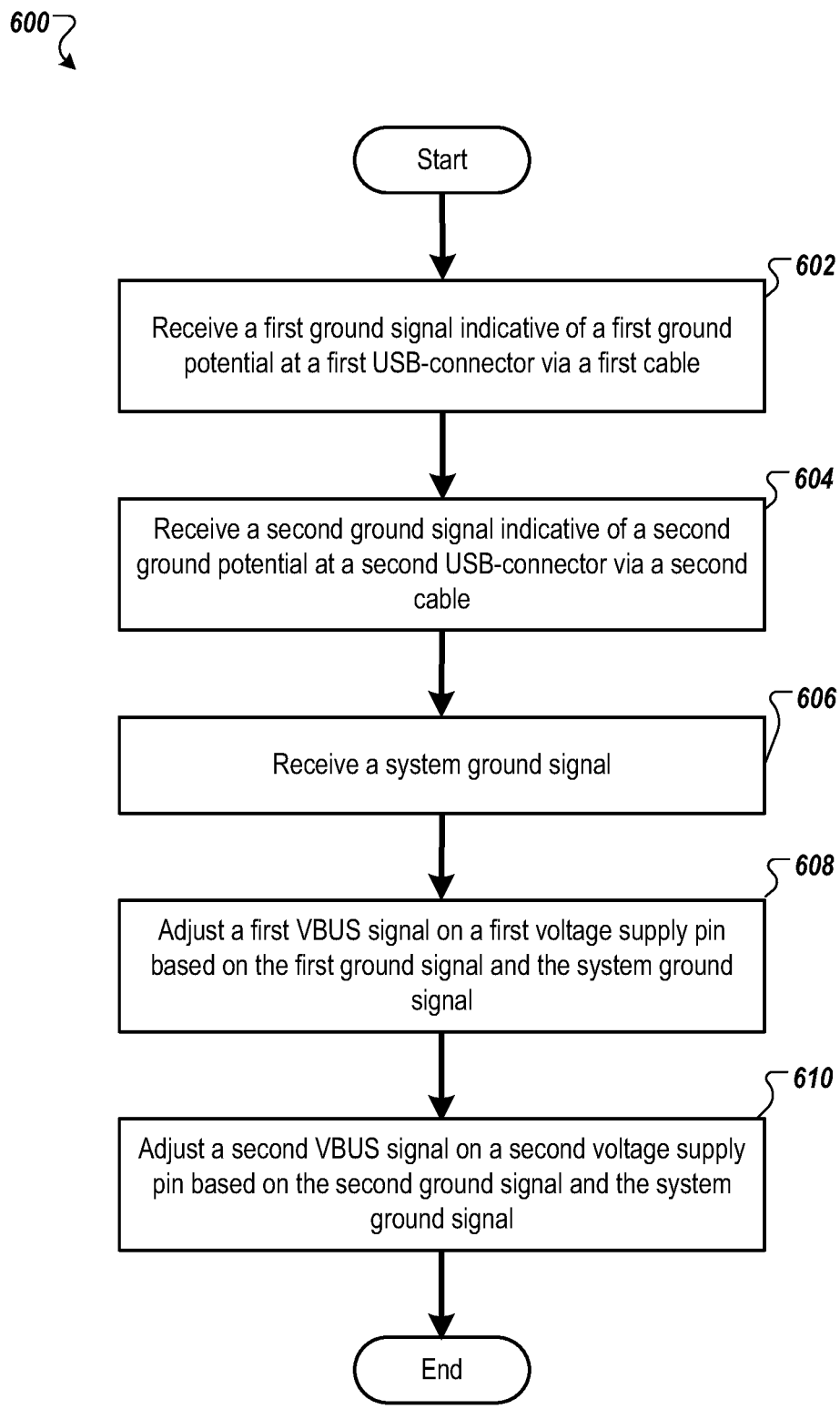
FIG. 6 is a flow diagram of a method of ground and supply cable compensation for a USB-PD power device, according to at least one embodiment.

FIG. 6 is a flow diagram of a method 600 of a ground and supply cable compensation scheme for a multi-port USB-PD device according to one embodiment. The method 600 may be performed by processing logic that comprises hardware (e.g., circuitry, dedicated logic, programmable logic, microcode, etc.), firmware, or a combination thereof. In one embodiment, the method 600 may be performed by any of the processing devices described herein. In one embodiment, the method 600 is performed by the USB-C controller 116 of FIG. 1. In another embodiment, the method 600 is performed by the USB-PD device 100 of FIG. 1. In another embodiment, the method 600 is performed by the dual-port USB-C controller 400 of FIG. 4. In at least one embodiment, the method 600 operates a USB-enabled device with a multi-port integrated circuit (IC) controller. In one embodiment, the processing logic executes a firmware-based method that performs the following operations. In another embodiment, the processing logic has embedded code or logic and is configured to execute instructions to perform the following operations.

The method 600 begins by the processing logic receiving a first ground signal indicative of a first ground potential at a first USB-C connector that is coupled to the multi-port IC controller via a first cable (block 602). The processing logic receives a second ground signal indicative of a second ground potential at a second USB-C connector coupled to the multi-port IC controller via a second cable (block 604). The processing logic receives a system ground signal (block 606). The first ground signal and the second ground signal are electrically isolated from the system ground signal. The processing logic adjusts a first power voltage (VBUS) signal on a first voltage supply terminal based on the first ground signal and the system ground signal (block 608). The processing logic adjusts a second VBUS signal on the second voltage supply terminal based on the second ground signal and the system ground signal (block 610), and the method 600 ends.

In a further embodiment, the processing logic sends or receives first control signatures using a first CC physical interface coupled to a first USB-C connector. The first CC physical interface operates at the same first ground potential as the first USB-C connector. In a further embodiment, the processing logic sends or receives second control signals using a second CC physical interface coupled to a second USB-C connector. The second CC physical interface operates at the same second ground potential as the second USB-C connector. In a further embodiment, the processing logic sends or receives third control signals using a third CC physical interface coupled to a third USB-C connector. The third CC physical interface operates at a same third ground potential as the third USB-C connector.

In at least one embodiment, the processing logic shifts voltage levels of the first control signals between the first CC physical interface and a processing core. The processing logic shifts the voltage levels of the second control signals between the second CC physical interface and the processing core.

In at least one embodiment, the processing logic senses the first ground potential at the first USB connector and generates the first ground signal indicative of the first ground potential at the first USB-C connector. In at least one embodiment, the processing logic senses the second ground potential at the second USB-C connector and generates the second ground signal indicative of the second ground potential at the second USB-C connector.

In at least one embodiment, the processing logic sends or receives first data signals using a first data physical interface coupled to the first USB-C connector. The first data physical interface operates at the same first ground potential as the first USB-C connector. In at least one embodiment, the processing logic sends or receives second data control signals using a second CC physical interface coupled to the second USB-C connector. The second CC physical interface operates at the same second ground potential as the second USB-C connector.

In the above description, some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "driving," "receiving," "controlling," "pulling down," "shorting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, the use of the words "example" or "exemplary" is intended to present concepts in a concrete fashion. As used in this application, the term "or" is intended to mean an inclusive "or" rather than an exclusive "or." Unless specified otherwise or clear from context, "X includes A or B" is intended to mean any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments described herein may also relate to an apparatus for performing the operations herein. This apparatus may be specially constructed for the required purposes, or it may comprise a general-purpose computer selectively activated or reconfigured by firmware instructions stored in the computer. Such firmware instructions may be stored in a non-transitory computer-readable storage medium, such as, but not limited to, any type of disk including optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media that store one or more sets of instructions. The term "computer-readable medium" shall also be taken to include any medium capable of storing, encoding, or carrying a set of instructions for execution by the machine, which causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The above description sets forth numerous specific details, such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A multi-port Universal Serial Bus Type-C (USB-C) controller comprising:
   a system ground terminal;
   a first port to couple to a first USB-C connector via a first cable, the first port comprising a first ground terminal, and a first power voltage line (VBUS) terminal, a first configuration channel (CC) terminal and a second CC terminal;
   a second port to couple to a second USB-C connector via a second cable, the second port comprising a second ground terminal, a second VBUS terminal, a third CC terminal and a fourth CC terminal;
   a first power control circuit (PCU) coupled to the system ground terminal and the first port, wherein the first PCU is to receive a first ground signal indicative of a first ground potential at the first USB-C connector and adjust a first VBUS signal on the first VBUS terminal based on the first ground signal and a system ground signal on the system ground terminal, wherein the first ground signal is electrically isolated from the system ground signal and
   a second PCU coupled to the system ground terminal and the second port, wherein the second PCU is to receive a second ground signal indicative of a second ground potential at the second USB-C connector and adjust a second VBUS signal on the second VBUS terminal based on the second ground signal and the system ground signal, wherein the second ground signal is electrically isolated from the system ground signal.

2. The multi-port USB-C controller of claim 1, further comprising:
   a first configuration channel (CC) physical interface coupled to the first ground terminal, the first CC terminal, and the second CC terminal, wherein the first CC physical interface operates at the same first ground potential as the first USB-C connector; and
   a second CC physical interface coupled to the second ground terminal, the third CC terminal, and the fourth CC terminal, wherein the second CC physical interface operates at the same second ground potential as the second USB-C connector.

3. The multi-port USB-C controller of claim 2, further comprising:
   a processing core coupled to the first PCU and the second PCU, wherein the processing core is configured to send or receive first control signals using the first CC physical interface and send or receive second control signals using the second CC physical interface;
   a first level shifter coupled to the first CC physical interface and the processing core, wherein the first level shifter is configured to adjust voltage levels of the first control signals between the processing core and the first CC physical interface; and
   a second level shifter coupled to the second CC physical interface and the processing core, wherein the second level shifter is configured to adjust voltage levels of the second control signals between the processing core and the first CC physical interface.

4. The multi-port USB-C controller of claim 3, further comprising:
   a third level shifter coupled to the first PCU and the processing core, wherein the third level shifter is configured to adjust voltage levels of signals between the first PCU and the processing core; and
   a fourth level shifter coupled to the second PCU and the processing core, wherein the fourth level shifter is configured to adjust voltage levels of signals between the second PCU and the processing core.

5. The multi-port USB-C controller of claim 1, wherein:
   the first ground terminal is coupled to a first ground-sense circuit, wherein the first ground-sense circuit is configured to:
      sense the first ground potential at the first USB-C connector; and
      generate the first ground signal indicative of the first ground potential at the first USB-C connector; and
   the second ground terminal is coupled to a second ground-sense circuit, wherein the second ground-sense circuit is configured to:
      sense the second ground potential at the second USB-C connector; and
      generate the second ground signal indicative of the second ground potential at the second USB-C connector.

6. The multi-port USB-C controller of claim 1, further comprising:
   a first data physical interface coupled to a first data terminal and a second data terminal, wherein the first data physical interface operates at the same first ground potential as the first USB-C connector; and
   a second data physical interface coupled to a third data terminal and a fourth data terminal, wherein the second data physical interface operates at the same second ground potential as the second USB-C connector.

7. A method for operating a Universal Serial Bus (USB)-enabled device comprising a multi-port integrated circuit (IC) controller, the method comprising:
   receiving, by the IC controller, a first ground signal indicative of a first ground potential at a first USB-C connector that is coupled to the multi-port IC controller via a first cable;
   receiving, by the IC controller, a second ground signal indicative of a second ground potential at a second USB-C connector that is coupled to the multi-port IC controller via a second cable; and receiving, by the IC controller, a system ground signal, wherein the first ground signal and the second ground signal are electrically isolated from the system ground signal;

adjusting, by the IC controller, a first power voltage (VBUS) signal on a first voltage supply terminal based on the first ground signal and the system ground signal; and adjusting, by the IC controller, a second VBUS signal on a first second voltage supply terminal based on the second ground signal and the system ground signal.

8. The method of claim 7, further comprising:

sending or receiving first control signals using a first configuration channel (CC) physical interface coupled to the first USB-C connector, wherein the first CC physical interface operates at the same first ground potential as the first USB-C connector; and sending or receiving second control signals using a second CC physical interface coupled to the second USB-C connector, wherein the second CC physical interface operates at the same second ground potential as the second USB-C connector.

9. The method of claim 8, further comprising:

shifting voltage levels of the first control signals between the first CC physical interface and a processing core; and shifting voltage levels of the second control signals between the second CC physical interface and the processing core.

10. The method of claim 8, further comprising:

sensing the first ground potential at the first USB-C connector; and generating the first ground signal indicative of the first ground potential at the first USB-C connector;

sensing the second ground potential at the second USB-C connector; and generating the second ground signal indicative of the second ground potential at the second USB-C connector.

11. The method of claim 7, further comprising:

sending or receiving first data signals using a first data physical interface coupled to the first USB-C connector, wherein the first data physical interface operates at the same first ground potential as the first USB-C connector; and sending or receiving second data control signals using a second CC physical interface coupled to the second USB-C connector, wherein the second CC physical interface operates at the same second ground potential as the second USB-C connector.

12. A system comprising:

a first Universal Serial Bus Type-C(USB-C) connector;

a second USB-C connector;

a multi-port Universal Serial Bus Type-C(USB-C) controller coupled to the first USB-C connector via a first cable and the second USB-C connector via a second cable, wherein the multi-port USB-C controller comprises:

a first ground terminal to couple to a system ground;

a second ground terminal to receive a first ground signal indicative of a first ground potential at a first USB-C connector that is coupled to the multi-port USB-C controller via a first cable, wherein the first ground signal is electrically isolated from the system ground;

a third ground terminal to receive a second ground signal indicative of a second ground potential at a second USB-C connector that is coupled to the multi-port USB-C controller via a second cable, wherein the second ground signal is electrically isolated from the system ground;

a first voltage supply terminal to couple to a first power voltage (VBUS) terminal of the first USB-C connector;

a second voltage supply terminal to couple to a second VBUS terminal of the second USB-C connector;

a first power control circuit (PCU) coupled to the first ground terminal, the second ground terminal, and the first voltage supply terminal, the first PCU to adjust a first VBUS signal on the first voltage supply terminal based on the first ground signal and the system ground; and a second PCU coupled to the first ground terminal, the third ground terminal, and the second voltage supply terminal, the second PCU to adjust a second VBUS signal on the second voltage supply terminal based on the second ground signal and the system ground.

13. The system of claim 12, wherein the multi-port USB-C controller further comprises:

a first configuration channel (CC) physical interface coupled to the first ground terminal, the first CC terminal, and the second CC terminal, wherein the first CC physical interface operates at the same first ground potential as the first USB-C connector; and a second CC physical interface coupled to the second ground terminal, the third CC terminal, and the fourth CC terminal, wherein the second CC physical interface operates at the same second ground potential as the second USB-C connector.

14. The system of claim 12, wherein the multi-port USB-C controller further comprises:

a processing core coupled to the first PCU and the second PCU, wherein the processing core is configured to send or receive first control signals using the first CC physical interface and send or receive second control signals using the second CC physical interface;

a first level shifter coupled to the first CC physical interface and the processing core, wherein the first level shifter is configured to adjust voltage levels of the first control signals between the processing core and the first CC physical interface; and a second level shifter coupled to the second CC physical interface and the processing core, wherein the second level shifter is configured to adjust voltage levels of the second control signals between the processing core and the first CC physical interface.

15. The system of claim 12, wherein the multi-port USB-C controller further comprises:

a third level shifter coupled to the first PCU and the processing core, wherein the third level shifter is configured to adjust voltage levels of signals between the first PCU and the processing core; and a fourth level shifter coupled to the second PCU and the processing core, wherein the fourth level shifter is configured to adjust voltage levels of signals between the second PCU and the processing core.

16. The system of claim 12, further comprising:

a first ground-sense circuit coupled to the first ground terminal, wherein the first ground-sense circuit is configured to:

sense the first ground potential at the first USB-C connector; and generate the first ground signal indicative of the first ground potential at the first USB-C connector; and a second ground-sense circuit coupled to the second ground terminal, wherein the second ground-sense circuit is configured to:

sense the second ground potential at the second USB-C connector; and generate the second ground signal indicative of the second ground potential at the second USB-C connector.

17. The system of claim 12, wherein the multi-port USB-C controller further comprises:

a first data physical interface coupled to a first data terminal and a second data terminal, wherein the first data physical interface operates at the same first ground potential as the first USB-C connector; and a second data physical interface coupled to a third data terminal and a fourth data terminal, wherein the second data physical interface operates at the same second ground potential as the second USB-C connector.

18. The system of claim 12, further comprising a vehicle entertainment system coupled to the multi-port USB-C controller.

19. The system of claim 12, wherein the first USB-C connector is located at a first location within a vehicle and the multi-port USB-C controller is located at a second location within the vehicle, and wherein the first cable extends between the first location and the second location.

20. The system of claim 12, further comprising a connector coupled to the multi-port USB-C controller, wherein the system is at least one of a head-unit charger, a rear-seat charger, a charger of an entertainment system.

* * * * *